UNITED STATES PATENT OFFICE.

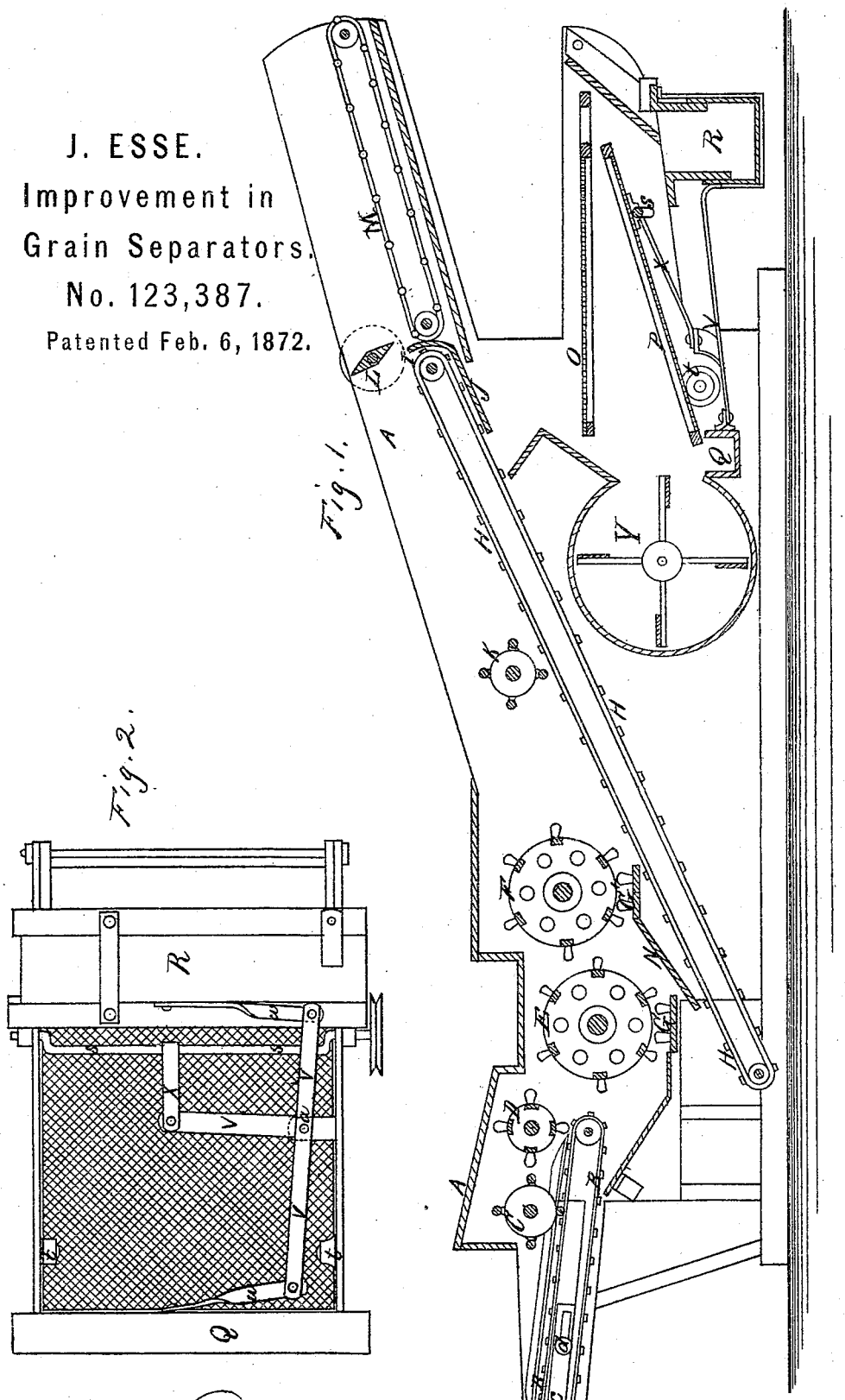
J. ESSE.
Improvement in Grain Separators.
No. 123,387.
Patented Feb. 6, 1872.

JOSEPH ESSE, OF REDWOOD CITY, CALIFORNIA.

IMPROVEMENT IN GRAIN-SEPARATORS.

Specification forming part of Letters Patent No. 123,387, dated February 6, 1872.

SPECIFICATION.

*To all whom it may concern:*

Be it known that I, JOSEPH ESSE, of Redwood City, county of San Mateo, State of California, have invented an Improved Separator; and I do hereby declare the following description and accompanying drawing are sufficient to enable any person skilled in the art or science to which it most nearly appertains to make and use the said invention without further invention or experiment.

My invention relates to certain improvements in thrashing and separating machines for wheat and other grain; and consists, principally, in the employment of an improved device for feeding the unthrashed straw to the cylinders, and also in an improved combination of cylinders for the purpose of more completely loosening the grain from the husk. It further consists in a novel arrangement and operating device for the separating or cleaning screens.

In order to more fully describe my invention, reference is made to the accompanying drawing forming a part of this specification, and the letters marked thereon, in which—

Figure I is a longitudinal section in elevation. Fig. II is a bottom view of the screens, showing their operating mechanism.

The same letters in the drawing refer to the same parts.

A is the separator frame or body, within which are placed the different parts of the mechanism. The unthrashed straw is first fed upon the carrying-belt B by the pitchers, and is conveyed beneath the revolving reel C, by which it is pressed down and laid upon the belt. From this it passes beneath a cylinder, D, having teeth similar to those in the thrashing-cylinder. This cylinder serves to distribute the straw that may be in masses, and to cause it to pass in a regular unvarying stream to the thrashing-cylinder. The thrashing-cylinders are two in number, E and F, constructed in the ordinary manner, with teeth, and having each a toothed concave, G, situated below them. The cylinder E first catches the straw and carries it downward through the teeth of the concave below, thus separating the grain from the straw. As the straw comes up on the other side of the cylinder it is caught by the second cylinder, F, and again subjected to the thrashing process, after which it falls upon the carrying-belt H, and is conveyed upward and backward to the point I, where the grain falls through and passes down a sort of chute, J, so as to fall upon the front end of the upper screen. The straw is pressed down so as to lie well on the belt by a revoling-reel, K, just after it leaves the cylinders, and another one, L, at the point where it leaves the belt H and passes upon the straw-carrier M. Returning to the cylinders, it will be seen that the grain which is thrashed out by the front cylinder E will fall upon an inclined chute, N, which carries it beneath the concave G, and allows it to fall directly upon the lower end of the belt H, so that it is not passed through the second cylinder. The screens O and P are secured in the screen-frame so as to stand at an angle with each other, the lower one, P, inclining downward at a considerable angle, so as to empty its contents of cleaned wheat into the discharge-spout Q. The cheat and mustard fall through both the upper and lower screens. The wheat is stopped by the lower screen, and the barley and chaff are carried over the rear edge of the upper screen, so as to fall into the discharge-spout R. The rear end of the shoe is supported upon a cranked arm, S, from a driving-shaft, and the front end rests upon rollers T. When in motion the screens have a peculiar movement, the forward end having a tossing motion while the rear end has a forward-and-back and rotary motion combined. This has the best effect for cleaning purposes. The discharge-spouts Q and R have a transverse sliding motion given them by means of a T-lever, V. This lever is pivoted at the point *a*, and the middle arm is connected by a pitman, X, with the crank-arm S. The extremities of the cross-arms are connected, one with each of the spouts Q and R, by rods W, thus communicating motion to them. As they stand at an angle this serves to discharge their contents without the use of a screw. The fan Y is situated beneath the carrying-belt H, and furnishes a blast of air to clean the grain on the screens.

The whole of the mechanism is driven from a horse-power or steam-engine by means of suitable driving-pulleys and belts. I prefer to make the belts of a round form and the grooves in the pulleys of such a shape as to give the best results.

The carrying-belts may be tightened up or relaxed at any time by means of slotted arms c, which carry the boxes of the shaft at one end of the belts. The arms are retained at any desired point by set-screws d.

Having thus described my invention, what I desire to secure by Letters Patent, is—

1. The adjustable carrying-belt B, in combination with the reel C and the feeding-cylinder D, constructed and operated substantially as and for the purpose described.

2. The two thrashing-cylinders E and F, with their respective concaves G and G' and the chute N, all combined to operate substantially as shown, and for the purpose described.

3. The shoe, consisting of the screens O and P, when held and operated by the crank-arms S at one end, and supported by and moving on the rollers t at the other, all constructed substantially as and for the purpose set forth.

4. The arrangement of the longitudinally-moving discharge-spouts Q and R with the levers V, pitman X, and connecting-rods W, or equivalent devices, operating in the relation to the shoe as and for the purpose herein stated.

JOSEPH ESSE.

Witnesses:
JOHN H. TITUS,
FRANK LARVEQUE.